US010470242B2

(12) United States Patent
Zhang et al.

(10) Patent No.: US 10,470,242 B2
(45) Date of Patent: Nov. 5, 2019

(54) PHASE COMPENSATION REFERENCE SIGNAL IN NR-SS COMP

(71) Applicant: QUALCOMM Incorporated, San Diego, CA (US)

(72) Inventors: Xiaoxia Zhang, San Diego, CA (US); Juan Montojo, San Diego, CA (US); Taesang Yoo, Riverside, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 15/637,457

(22) Filed: Jun. 29, 2017

(65) Prior Publication Data
US 2018/0146506 A1    May 24, 2018

Related U.S. Application Data

(60) Provisional application No. 62/424,202, filed on Nov. 18, 2016.

(51) Int. Cl.
*H04W 84/18* (2009.01)
*H04W 76/10* (2018.01)
(Continued)

(52) U.S. Cl.
CPC ............ *H04W 84/18* (2013.01); *H04B 7/024* (2013.01); *H04L 5/0035* (2013.01);
(Continued)

(58) Field of Classification Search
CPC ..... H04B 7/024; H04B 7/0626; H04L 1/0026; H04L 5/0035; H04L 5/0048;
(Continued)

(56) References Cited

U.S. PATENT DOCUMENTS 8,599,810 B2    12/2013   Sun et al.
8,792,372 B2    7/2014    Wang
(Continued)

FOREIGN PATENT DOCUMENTS

EP    2830370 A1    1/2015
EP    2890176 A1    7/2015
(Continued)

OTHER PUBLICATIONS

<Span style="font-family: calibri;">Ericsson: "On DL and UL CPE compensation in MIMO", R1-1612334, 3GPP TSG-RAN WG1 #87, Reno, USA, Nov. 14-18, 2016, pp. 1-4.
(Continued)

*Primary Examiner* — Eric Nowlin
(74) *Attorney, Agent, or Firm* — Liem T. Do

(57) ABSTRACT

Phase compensation in a new radio (NR) shared spectrum (NR-SS) coordinated multipoint (CoMP) environment is discussed. A base station may synchronize the phase between one or more additional base stations in a coordinated multipoint (CoMP) group serving one or more user equipments (UEs). This first synchronizing is performed prior to a current transmission opportunity between the CoMP group and the UEs. During transmission, a UE will sent a phase compensation reference signal (PCRS) to help with adjusting a phase drift that exceeds a predetermined threshold. The PCRS may be triggered by a signal from the base station or may be sent routinely by the UE. The UEs will transmit PCRS after each subframe, which the base stations use to adjust the phase.

16 Claims, 9 Drawing Sheets

(51) Int. Cl.
*H04M 11/06* (2006.01)
*H04W 4/18* (2009.01)
*H04W 8/00* (2009.01)
*H04B 7/024* (2017.01)
*H04W 56/00* (2009.01)
*H04L 5/00* (2006.01)

(52) U.S. Cl.
CPC .......... *H04L 5/0048* (2013.01); *H04L 5/0053* (2013.01); *H04M 11/066* (2013.01); *H04W 4/18* (2013.01); *H04W 8/005* (2013.01); *H04W 56/001* (2013.01); *H04W 76/10* (2018.02)

(58) Field of Classification Search
CPC ... H04L 27/2675; H04M 11/066; H04W 4/18; H04W 8/005; H04W 56/001; H04W 72/04; H04W 76/10; H04W 84/18
See application file for complete search history.

(56) References Cited

U.S. PATENT DOCUMENTS

| | | | | |
|---|---|---|---|---|
| 8,867,503 | B2 * | 10/2014 | Baligh | H04B 7/024 |
| | | | | 370/336 |
| 9,237,535 | B2 * | 1/2016 | Yuan | H04L 25/0202 |
| 9,312,984 | B2 * | 4/2016 | Nagata | H04L 1/0026 |
| 9,860,861 | B2 * | 1/2018 | Wu | H04W 56/001 |
| 10,194,457 | B2 * | 1/2019 | Rune | H04W 72/1268 |
| 10,305,537 | B2 * | 5/2019 | Fan | H04L 27/2663 |
| 2012/0099730 | A1 * | 4/2012 | Nakamura | H04W 72/0466 |
| | | | | 380/287 |
| 2013/0029586 | A1 * | 1/2013 | Wang | H04L 25/0204 |
| | | | | 455/3.01 |
| 2013/0235818 | A1 * | 9/2013 | Yuan | H04L 25/0202 |
| | | | | 370/329 |
| 2014/0050202 | A1 * | 2/2014 | Baligh | H04B 7/024 |
| | | | | 370/336 |
| 2015/0327191 | A1 * | 11/2015 | Park | H04W 56/00 |
| | | | | 370/350 |
| 2016/0043839 | A1 | 2/2016 | Jitsukawa | |
| 2016/0308597 | A1 | 10/2016 | Kim et al. | |
| 2017/0019914 | A1 * | 1/2017 | Rune | H04W 72/1284 |
| 2017/0311273 | A1 * | 10/2017 | Wu | H04W 56/0035 |
| 2018/0091353 | A1 * | 3/2018 | Puleri | H04L 1/00 |
| 2018/0302866 | A1 * | 10/2018 | Zhang | H04W 56/001 |
| 2018/0317186 | A1 * | 11/2018 | Fan | H04B 7/024 |
| 2018/0375545 | A1 * | 12/2018 | Fan | H04L 27/2663 |

FOREIGN PATENT DOCUMENTS

| | | | | |
|---|---|---|---|---|
| EP | 3085184 A1 * | 10/2016 | | H04W 72/1268 |
| WO | WO-2010016865 A1 * | 2/2010 | | H04B 7/022 |
| WO | WO-2013041757 A1 | 3/2013 | | |
| WO | WO-2014119888 A1 | 8/2014 | | |
| WO | WO-2015094033 A1 * | 6/2015 | | H04W 72/1268 |

OTHER PUBLICATIONS

International Search Report and Written Opinion—PCT/US2017/060899—ISA/EPO—dated Feb. 19, 2018.

* cited by examiner

PHASE COMPENSATION REFERENCE SIGNAL IN NR-SS COMP

CROSS-REFERENCE TO RELATED APPLICATIONS

This application claims the benefit of U.S. Provisional Patent Application No. 62/424,202, entitled, "PHASE COMPENSATION REFERENCE SIGNAL IN NR-SS COMP," filed on Nov. 18, 2016, which is expressly incorporated by reference herein in its entirety.

BACKGROUND

Field

Aspects of the present disclosure relate generally to wireless communication systems, and more particularly, to phase compensation reference signals (PCRS) in a new radio (NR) shared spectrum (NR-SS) coordinated multipoint (CoMP) environment.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes synchronizing, at a base station, a phase between one or more additional base stations in a coordinated multipoint (CoMP) group serving one or more UEs, wherein the synchronizing is performed prior to a current transmission opportunity between the CoMP group and the one or more UEs, transmitting data to the one or more UEs in the current transmission opportunity, detecting a phase drift that exceeds a predetermined threshold during the current transmission opportunity, receiving a phase compensation reference signal from each of the one or more UEs; and adjusting the phase according to the phase compensation reference signals for receipt of uplink transmissions from a corresponding UE of the one or more UEs.

In an additional aspect of the disclosure, an apparatus configured for wireless communication, includes means for synchronizing, at a base station, a phase between one or more additional base stations in a CoMP group serving one or more UEs, wherein the means for synchronizing is performed prior to a current transmission opportunity between the CoMP group and the one or more UEs, means for transmitting data to the one or more UEs in the current transmission opportunity, detecting a phase drift that exceeds a predetermined threshold during the current transmission opportunity, means for receiving a phase compensation reference signal from each of the one or more UEs; and means for adjusting the phase according to the phase compensation reference signals for receipt of uplink transmissions from a corresponding UE of the one or more UEs.

In an additional aspect of the disclosure, a non-transitory computer-readable medium having program code recorded thereon. The program code further includes code to synchronize, at a base station, a phase between one or more additional base stations in a CoMP group serving one or more UEs, wherein the code to synchronized is performed prior to a current transmission opportunity between the CoMP group and the one or more UEs, transmitting data to the one or more UEs in the current transmission opportunity, code to detect a phase drift that exceeds a predetermined threshold during the current transmission opportunity, code to receive a phase compensation reference signal from each of the one or more UEs; and code to adjust the phase according to the phase compensation reference signals for receipt of uplink transmissions from a corresponding UE of the one or more UEs.

In an additional aspect of the disclosure, an apparatus configured for wireless communication is disclosed. The apparatus includes at least one processor, and a memory coupled to the processor. The processor is configured to synchronize, at a base station, a phase between one or more additional base stations in a CoMP group serving one or more UEs, wherein the configuration to synchronize is performed prior to a current transmission opportunity between the CoMP group and the one or more UEs, to transmit data to the one or more UEs in the current transmission opportunity, to detect a phase drift that exceeds a predetermined threshold during the current transmission opportunity, to receive the phase compensation reference signal from each of the one or more UEs; and to adjust the phase according to the phase compensation reference signals for receipt of uplink transmissions from a corresponding UE of the one or more UEs.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
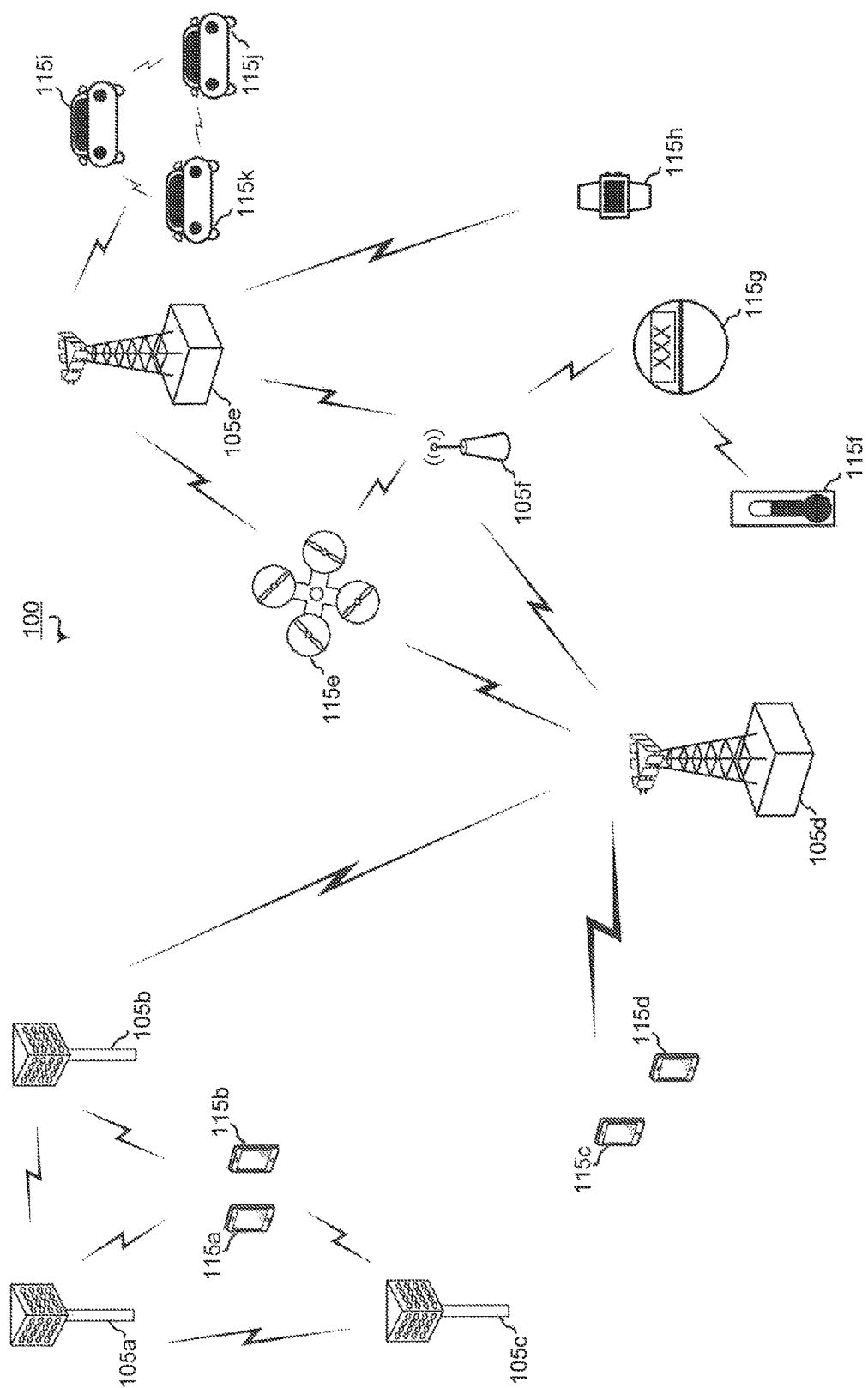
FIG. 1 is a block diagram illustrating details of a wireless communication system.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of evolved node Bs (eNBs) 105 and other network entities. An eNB may be a station that communicates with the UEs and may also be referred to as a base station, a an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105d and 105e are regular macro eNBs, while eNBs 105a-105c are macro eNBs enabled with one of 3 dimension (3D), full dimension (FD), or massive MIMO. eNBs 105a-105c take advantage of their higher dimension MIMO capabilities to exploit 3D beamforming in both elevation and azimuth beamforming to increase coverage and capacity. eNB 105f is a small cell eNB which may be a home node or portable access point. An eNB may support one or multiple (e.g., two, three, four, and the like) cells.

The 5G network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the eNBs, whether macro eNB, small cell, or the like. In FIG. 1, a lightning bolt (e.g., communication links) indicates wireless transmissions between a UE and a serving eNB, which is an eNB designated to serve the UE on the downlink and/or uplink, or desired transmission between eNBs, and backhaul transmissions between eNBs.

In operation at 5G network 100, eNBs 105a-105c serve UEs 115a and 115b using 3D beamforming and coordinated spatial techniques, such as coordinated multipoint (CoMP) or multi-connectivity. Macro eNB 105d performs backhaul communications with eNBs 105a-105c, as well as small cell, eNB 105f. Macro eNB 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro eNBs 105d and 105e, as well as small cell eNB 105f. Other machine type devices, such as UE 115*f* (thermometer), UE 115*g* (smart meter), and UE 115*h* (wearable device) may communicate through 5G network 100 either directly with base stations, such as small cell eNB 105*f*, and macro eNB 105*e*, or in multi-hop configurations by communicating with another user device which relays its information to the network, such as UE 115*f* communicating temperature measurement information to the smart meter, UE 115*g*, which is then reported to the network through small cell eNB 105*f*. 5G network 100 may also provide additional network efficiency through dynamic, low-latency TDD/FDD communications, such as in a vehicle-to-vehicle (V2V) mesh network between UEs 115*i*-115*k* communicating with macro eNB 105*e*.

Figure 2:
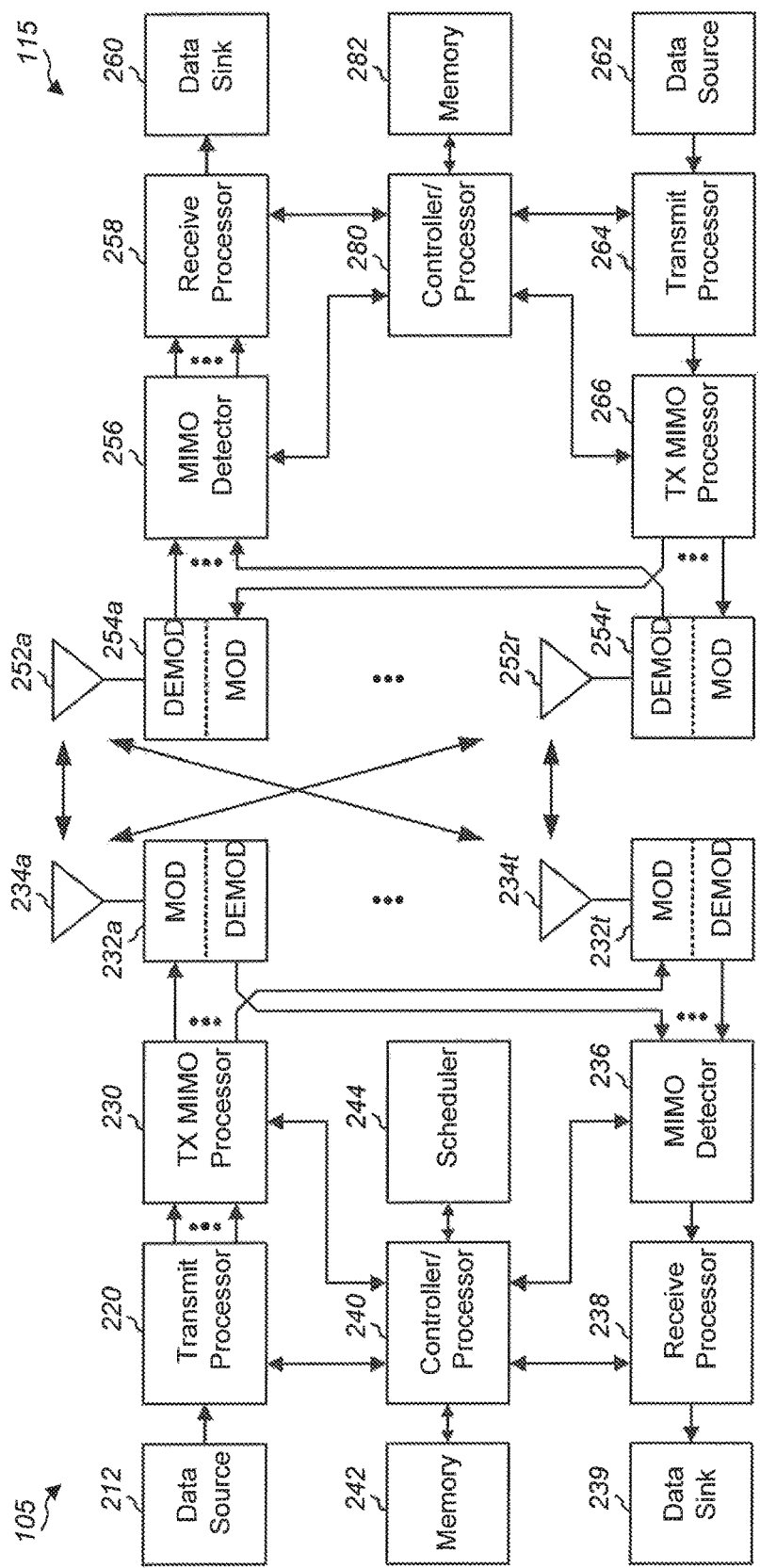
FIG. 2 is a block diagram illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. At the eNB 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At the UE 115, the antennas 252*a* through 252*r* may receive the downlink signals from the eNB 105 and may provide received signals to the demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254*a* through 254*r*, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254*a* through 254*r* (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIG. 5, and/or other processes for the techniques described herein. The memories 242 and 282 may store data and program codes for the eNB 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
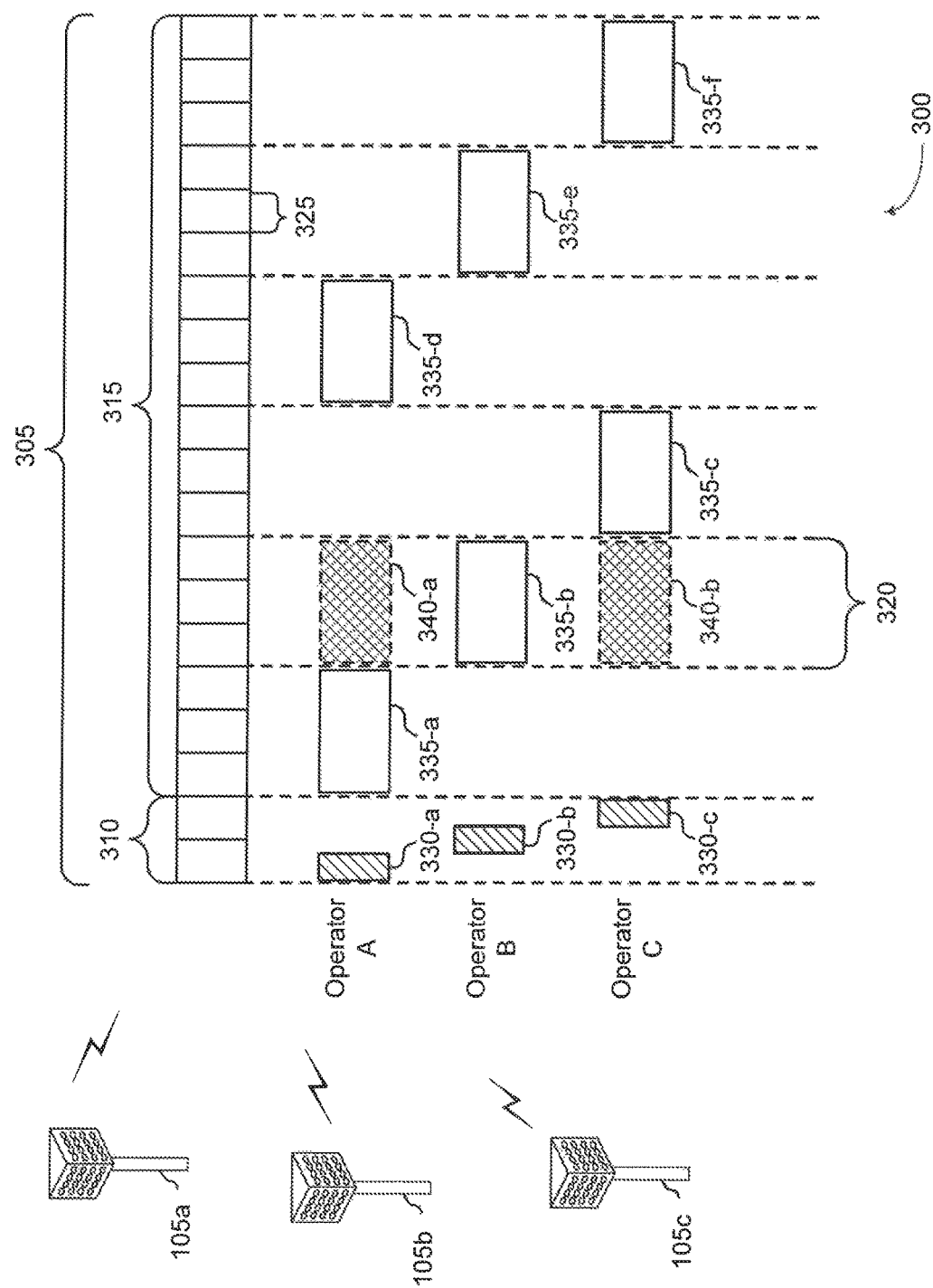
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-fNT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Wireless operations that use coordinated multipoint (CoMP) transmissions include a range of different techniques that enable the dynamic coordination of transmission and reception over a variety of different base stations. CoMP generally falls into two major categories: joint processing, where there is coordination between multiple entities—base stations—that are simultaneously transmitting or receiving to or from UEs; and coordinated scheduling or beamforming, where a UE transmits with a single transmission or reception point, while the communication is made with an exchange of control among several coordinated entities. The joint processing form of CoMP also includes a subclass referred to as joint transmission, in which UE data is simultaneously process and transmitted from multiple cooperating base stations. In heterogeneous and dense small cell network scenarios with low power nodes, UEs may experience significant signal strength simultaneously from multiple base stations. In order to manage both downlink and uplink joint transmission CoMP, accurate and up-to-date channel state information (CSI) feedback is used.

Figure 4A:
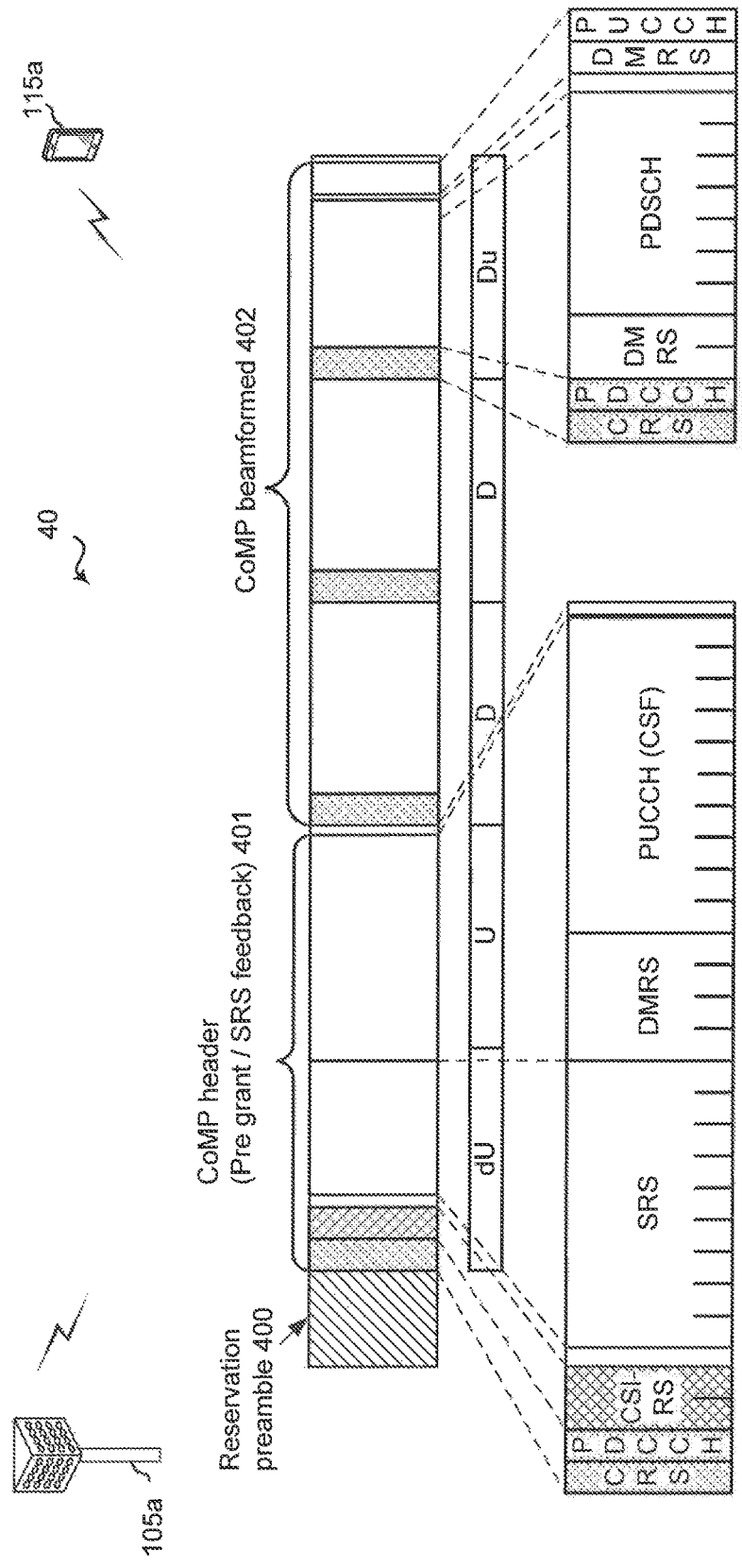
FIGS. 4A and 4B are block diagrams illustrating CoMP downlink and uplink data transmissions between a base station and UE.
Figure 4B:
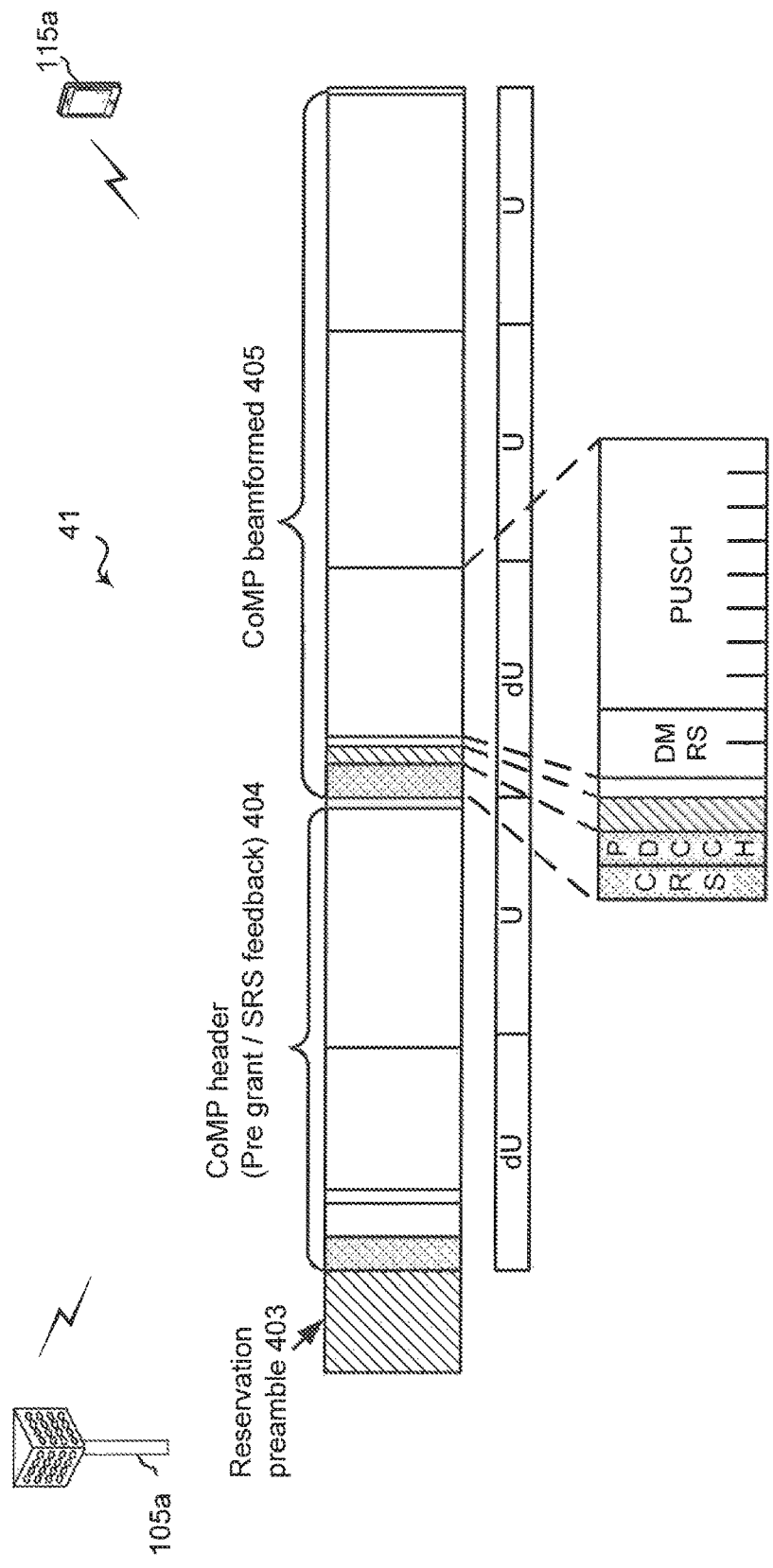

FIGS. 4A and 4B are block diagrams illustrating CoMP downlink and uplink data transmissions 40 and 41 between a base station 105a and UE 115a. Base station 105a and UE 115a participate in communications over a shared spectrum, such as according to NR-SS operations. Prior to communicating on the shared spectrum, the transmitting entity, base station 105a in FIG. 4A and UE 115a in FIG. 4B, performs an LBT procedure in reservation preambles 400 and 403. Once the channel has been secured, at the beginning of each of downlink CoMP data transmission 40 and uplink CoMP data transmission 41, sounding reference signal (SRS) feedback is transmitted by UE 115a within CoMP header 401 and 404. CoMP headers 401 and 404 include a downlink "pre-grant" of a SRS/channel state feedback (CSF) request, CSI-RS, along with an UL "pre-grant ACK," including the SRS and CSF (PUCCH) response to the request. The uplink CoMP operation is reciprocal to the downlink CoMP operation. Remote transmission points communicate in-phase and quadrature (I/Q) samples to a central base station. On the downlink, the base stations in the CoMP set jointly process the signal-to-leakage ratio (SLR) beamforming into the communication channel including the minimum mean square equalization (MMSE). On the uplink side, precoding is performed onto the channel again with MMSE equalization for the SLR beamformin. It is noted that the CoMP transmissions and receptions techniques may be applicable to both the licensed and unlicensed networks when a plurality of base stations, such as eNB, gNB, etc, perform joint transmission or joint reception.

In general, within the downlink CoMP operations (FIG. 4A), a base station, such as base station 105a, chooses UEs, such as UE 115a, to schedule and requests SRS feedback ("pre-grant"). UE 115a transmits SRS in addition to DMRS and the CSF within the PUCCH of downlink CoMP header 401. Base station 105a determines the SLR beams and modulation coding scheme (MCS) based on the SRS. Downlink beamformed data 402 includes downlink transmissions of control/data (e.g., CRS, downlink grants in the PDCCH, DMRS, PDSCH), which are transmitted via SLR-beamforming. At the end of downlink CoMP beamformed data 402, base station 105a receives uplink acknowledgement via the DMRS and PUCCH, which are received via MMSE (SLR) equalization. In some aspects, the PUCCH may be received with joint uplink reception. In additional aspects, the PUCCH may be received without joint processing.

Within the uplink CoMP operations (FIG. 4B), base station chooses to schedule UE 115a and requests SRS feedback ("pre-grant") within uplink CoMP header 404. UE 115a transmits SRS for the "pre-grant ACK" in uplink CoMP header 400, after which base station 105a determines the SLR beams and MCS. Downlink controls, such as CRS, uplink grants, and the like, may also be transmitted via SLR-beamforming. Alternatively, downlink controls may be transmitted without joint processing. After uplink CoMP header 404, the data are received in uplink CoMP beamformed data 405 with DMRS and PUSCH via MMSE (SLR) equalization.

CoMP performance is mainly limited by channel accuracy at the base station as it affects beam selection. For each transmission opportunity, a phase synchronization may be performed in the beginning of the transmission opportunity. However, a single phase synchronization per transmission opportunity may not be sufficient when the phase drift within the transmission opportunity is non-negligible. Because CoMP operations rely on the interoperations between multiple base stations, the phase coherence is much more strict as compared to single point processing. Non-negligible phase drift over the transmission opportunity can greatly degrade the CoMP performance. Accordingly, various aspects of the present disclosure are directed to provide a phase compensation reference signal (PCSR) that may be transmitted when the phase drift exceeds a predetermined threshold. The PCRS allows the base station or other transmitting node to compensate for the phase drift.

Figure 5:
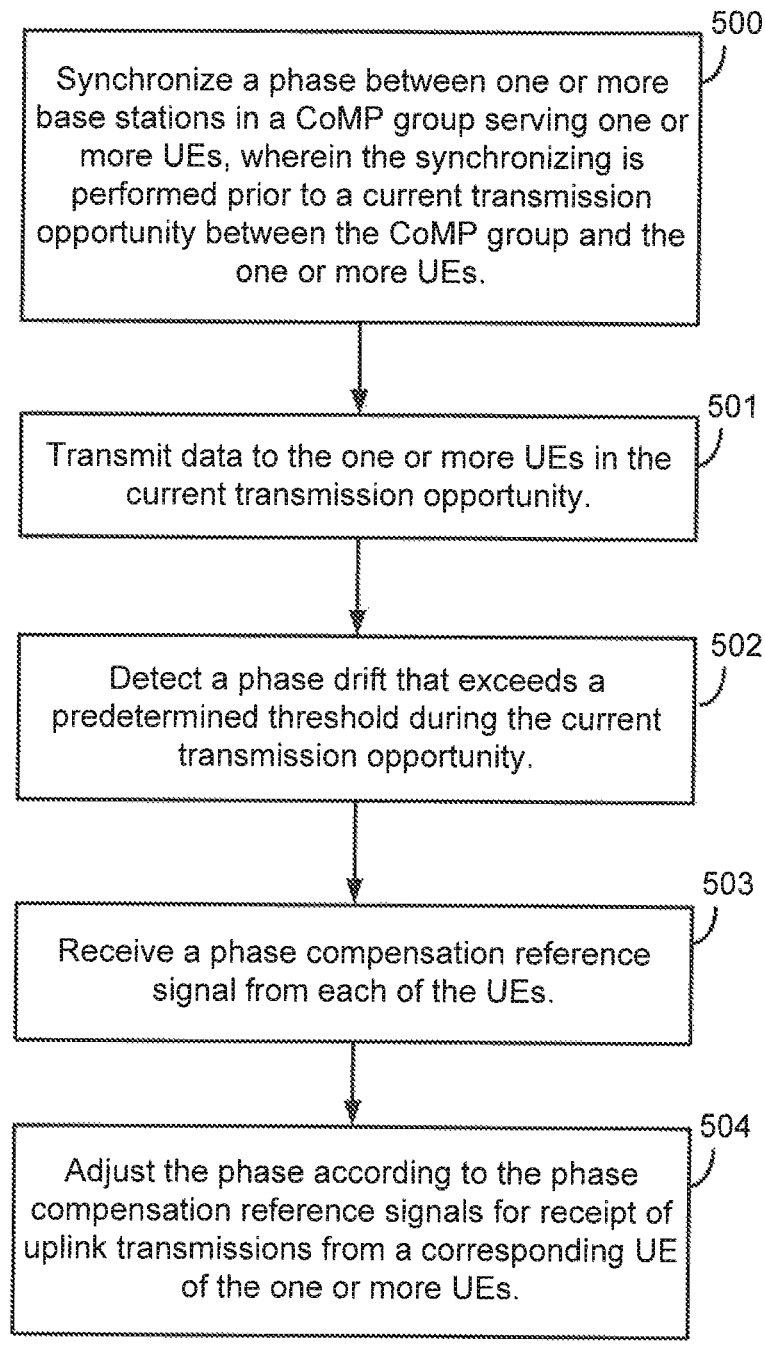
FIG. 5 is a block diagram illustrating example blocks executed to implement one aspect of the present disclosure.

FIG. 5 is a block diagram illustrating example blocks executed to implement one aspect of the present disclosure. At block 500, a base station synchronizes a phase between one or more other base stations in a CoMP group serving one or more UEs, wherein the synchronizing is performed prior to a current transmission opportunity between the CoMP group and the one or more UEs. Prior to beginning transmissions for a current transmission opportunity, the base stations of the CoMP set synchronize phase among the members of the set.

At block 501, a base station of the CoMP group transmits data to the UEs in the current transmission opportunity. At block 502, the base station of the CoMP group detects a phase drift that exceeds a predetermined threshold during the current transmission opportunity. Each of the different base stations in a given CoMP set may have different front end electronics and different clocks and crystals, that might result in different jitter, which may cause the phase drift over the course of the transmission opportunity.

At block 503, the base station receives a phase compensation reference signal from each of the UEs. When the phase drift is too large within a transmission opportunity, the UEs may transmit PCRS at the end of each subframe. The PCRS may be triggered via signaling received from the base stations, such as semi-static or dynamic signaling, or the UEs may either begin transmissions on their own detection of phase drift, or simply send the PCRS after each subframe regardless of detecting a phase drift. The UEs may send the PCRS after each subframe upon the trigger of the base stations regardless of detecting a phase drift. Each base station of the CoMP set may receive a PCRS from each served UE and uses the PCRS to determine the phase adjustment in a channel from each UE to each base station.

At block 504, the base station adjusts the phase according to the phase compensation reference signal for receipt of uplink transmissions from a corresponding UE of the one or more UEs. Thus, when excessive phase drift is detected during a transmission opportunity, transmission of PCRS may be semi-statically triggered in order to aid in adjusting the channel back into synchronization.

Figure 6:
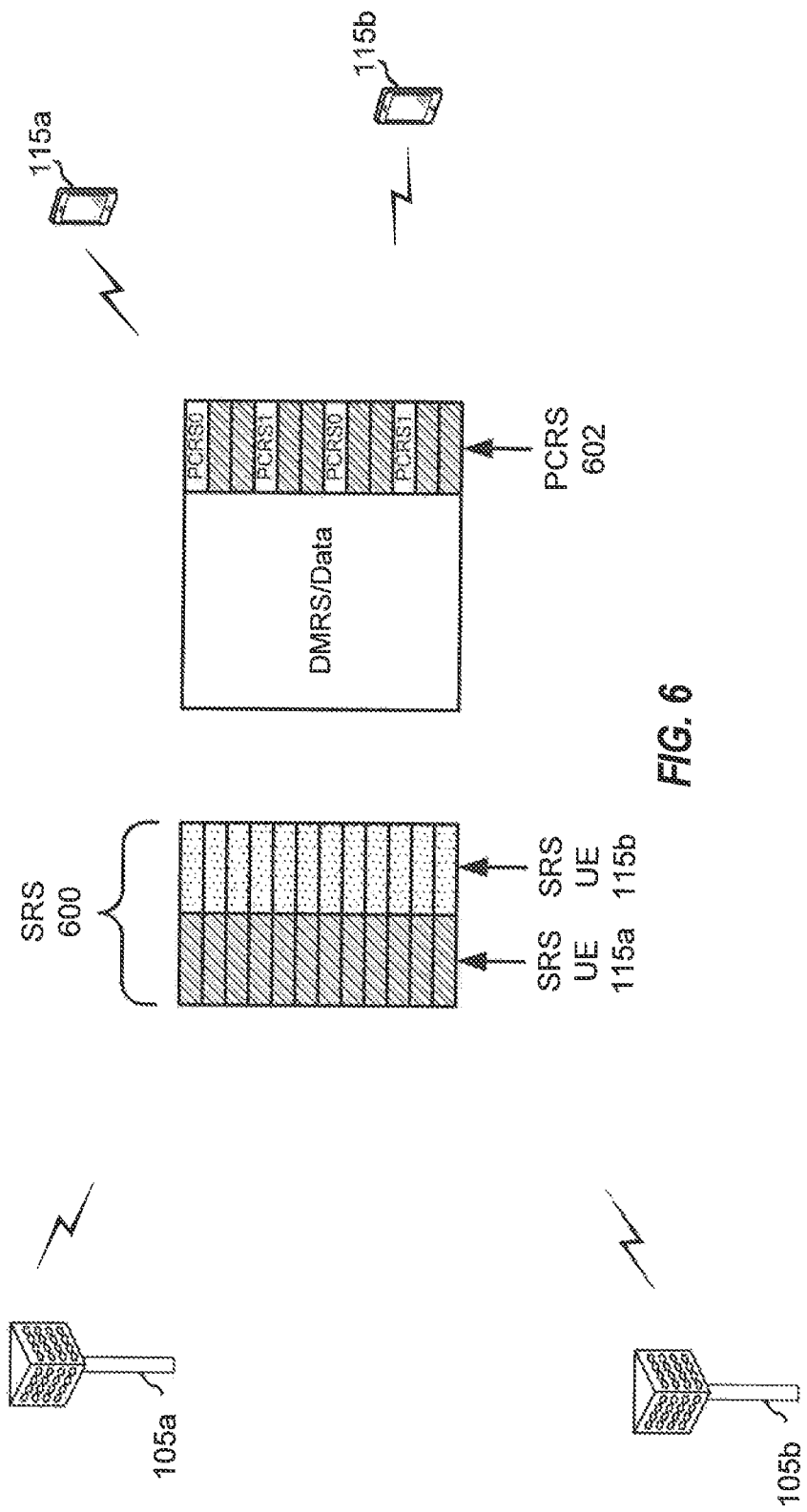
FIG. 6 is a block diagram illustrating transmissions between base stations of a CoMP set, base stations, and served UEs, configured according to one aspect of the present disclosure.

FIG. 6 is a block diagram illustrating transmissions between base stations of a CoMP set, base stations 105a and 105b, and served UEs, UEs 115a and 115b, configured according to one aspect of the present disclosure. When PCRS 602 are transmitted due to the intra-transmission opportunity phase drift exceeding the threshold limit, PCRS 602 are transmitted by all scheduled UEs, e.g., UE 115a, UE 115b, and are meant for the different base stations, including base stations 105a and 105b, to obtain a phase drift relative to SRS feedback 600 at the beginning of the transmission opportunity. Thus, using SRS feedback 600, each of base stations 105a and 105b determines a relative channel between the base station and each individual UE, UEs 115a and 115b, based on the original SRS feedback 600 of UEs 115a and 115b. Because the base stations, such as base stations 105a and 105b, will not use PCRS 602 to determine channel feedback, the structure of PCRS 602 would not necessarily have the same density as SRS feedback 600. PCRS 602 is meant to compensate the estimated channel with the phase drift that has occurred from SRS feedback 600 transmissions to PCRS 602.

In one example aspect, PCRS 602 could use the structure of SRS 600, but with a reduced time/frequency density, hence, a single symbol may be expected to accommodate all scheduled UEs. In some example aspects, PCRS 602 can use SRS 600. PCRS 602 can be transmitted with/within transmissions of SRS 600.

Figure 7A:
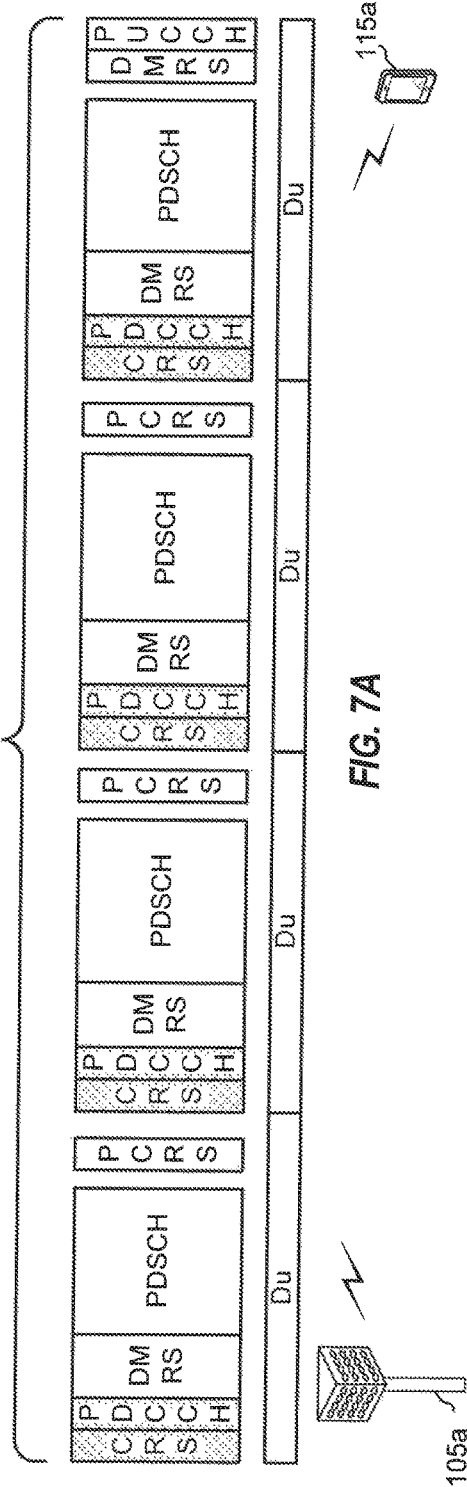
FIGS. 7A and 7B are block diagrams illustrating a base station and UE configured according to one aspect of the present disclosure.
Figure 7B:
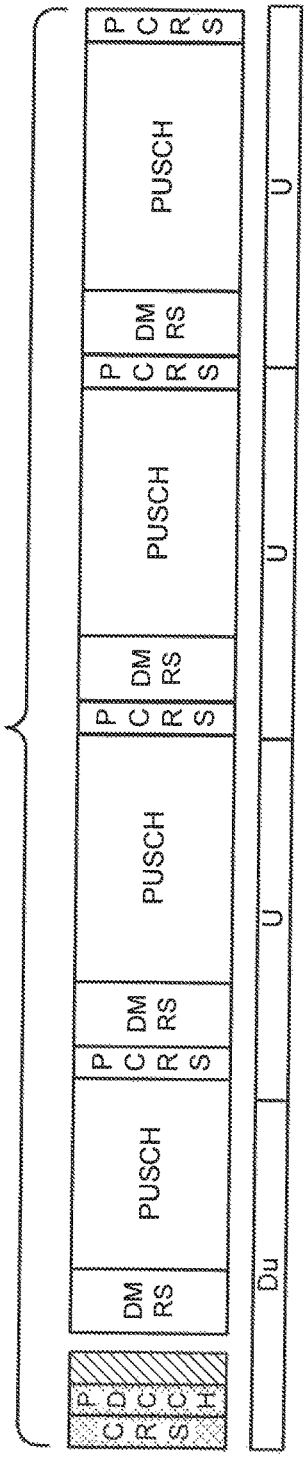

FIGS. 7A and 7B are block diagrams illustrating a base station 105a and UE 115a configured according to one aspect of the present disclosure. With regard to the downlink CoMP data burst 700 (FIG. 7A), each subframe is configured as a Du subframe to include a downlink portion of transmission and an uplink portion of transmission. During transmission of the downlink data in PDSCH, an excessive phase drift may occur. The detection of the phase drift may prompt base station 105a to semi-statically or dynamically send a trigger signal for UE 115a to transmit PCRS. Alternatively, UE 115a may send PCRS without a triggering signal from base station 105a. UE 115a, accordingly, transmits PCRS on the uplink at the end of each subframe of downlink CoMP data burst 700. Base station 105a uses the PCRS from UE 115a and compares that against the "pre-grant" SRS transmitted by UE 115a at the beginning of the transmission opportunity.

Similarly, uplink CoMP data burst 701, includes one initial Du subframe that carries the uplink grants for uplink transmissions in the remaining subframes. When the phase shift has been detected and PCRS triggered at the end of each subframe, base station 105a will use that PCRS in comparison with the original synchronization from the SRS to determine an adjustment for the drift that exceeded the predetermined threshold.

For uplink CoMP operations, base station 105a estimates the relative phase drift from SRS to PCRS in each subframe and for each UE. All eNBs, including base station 105a, in the joint processing of the CoMP set compensate the uplink channel from SRS with the relative phase drift and obtain the SLR beam for CoMP reception. For DL CoMP operations, the typical assumption provides that the phase drift on the base station transmitter/UE receiver is the same as UE transmitter/base station receiver. Such channel reciprocity can be achieved using a common phase locked loop (PLL) source on transmitter and receiver within the same node. This channel reciprocity may also be referred to as phase drift reciprocity. All eNBs, such as base station 105a, estimate the relative phase drift from the preliminary synchronization SRS to semi-statically triggered PCRS for each UE 115a, apply it to the downlink channel and update the SLR beam for joint transmission accordingly.

Figure 8:
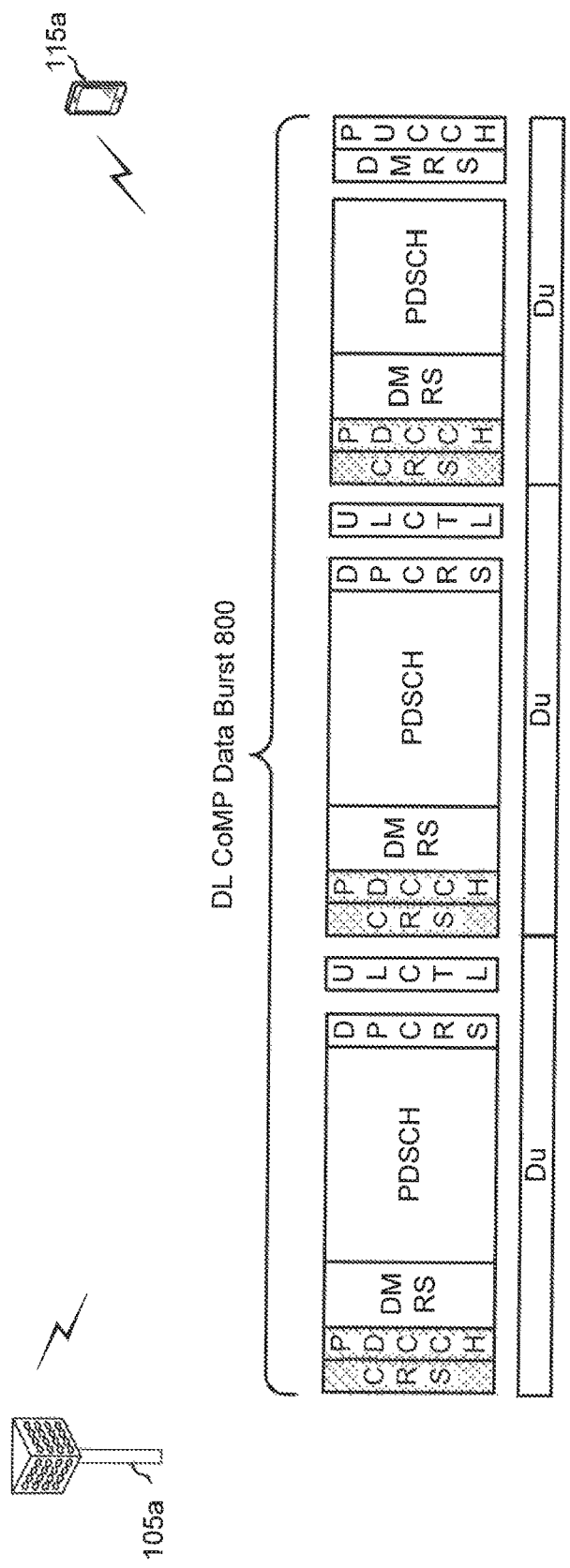
FIG. 8 is a block diagram illustrating a base station and UE configured according to one aspect of the present disclosure.

FIG. 8 is a block diagram illustrating a base station 105a and UE 115a configured according to one aspect of the present disclosure. For the downlink CoMP data burst 800 operations, if phase drift on the base station transmitter/UE receiver is not the same as the UE transmitter and base station. The assumption of channel/phase drift reciprocity between downlink and uplink no longer applies. A mismatch may arise, for example, when a eNB uses separate PLLs for the transmitter and receiver. In contrast to only an uplink PCRS being triggered and transmitted by the UE, when transmitter and receiver are not synchronous, downlink PCRS may be transmitted from all of the eNBs involved in CoMP. UEs, such as UE 115a, measure the downlink phase drift by comparing the downlink PCRS relative to the CSI-RS transmitted in CoMP header. The phase drift reflects the change on (eNB Tx, UE Rx). UEs report the phase drift seen on DL PCRS in UL control. All eNBs obtain the phase drift feedback from each UE and apply it to DL channel and update the SLR beam for joint transmission accordingly. In some example aspects, downlink PCRS can reuse CSI-RS transmission or RS transmission. Downlink PCRS can be transmitted with/within CSI-RS transmission, RS transmission, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   synchronizing, at a base station, a phase between one or more additional base stations in a coordinated multipoint (CoMP) group serving one or more user equipments (UEs) to include the base station into the CoMP group, wherein the synchronizing is performed prior to a current transmission opportunity between the CoMP group and the one or more UEs;
   transmitting or receiving data in the current transmission opportunity;
   detecting a phase drift that exceeds a predetermined threshold during the current transmission opportunity;
   signaling the one or more UEs to transmit the phase compensation reference signal in response to the detected phase drift;
   receiving a phase compensation reference signal from each of the one or more UEs subsequent to the synchronizing the phase between the one or more additional base stations in the CoMP group; and
   adjusting the phase according to the phase compensation reference signals.

2. The method of claim 1, wherein the phase compensation reference signal uses uplink sounding reference signal (SRS) transmission.

3. The method of claim 1, wherein the adjusting the phase includes:
   determining another phase drift based on the phase compensation reference signal relative to the base station;
   obtaining a phase adjustment based on a comparison of the synchronized phase and the another phase drift; and
   adjusting the phase by the phase adjustment.

4. The method of claim 1, wherein the adjusting the phase includes one or more of:
   adjusting the phase according to the phase compensation reference signals for transmission of additional downlink data to the one or more UEs in the current transmission opportunity; or
   adjusting the phase according to the phase compensation reference signals for receipt of additional uplink data from a corresponding UE of the one or more UEs in the current transmission opportunity.

5. A method of wireless communication, comprising:
   detecting, at a base station, a phase mismatch between transmission and reception within a coordinated multipoint (CoMP) group among the base station and one or more additional base stations serving one or more user equipments (UEs), wherein the phase mismatch identifies a lack of phase drift reciprocity in the CoMP group, wherein the lack of phase drift reciprocity indicates that a phase drift due to transmission from a first base station in the CoMP group and reception by the one or more UEs is different from a phase drift due to reception by the first base station in the CoMP group and transmission from the one or more UEs;
   in response to the detecting the phase mismatch, transmitting a downlink phase compensation reference signal;
   receiving an uplink phase drift report from each of the one or more UEs in response to the downlink phase compensation reference signal; and adjusting a phase based on the uplink phase drift report for transmission of downlink data within a current transmission opportunity.

6. The method of claim 5, further including:
synchronizing the phase among the base station and the one or more additional base stations within the CoMP group, wherein the synchronizing is performed prior to the current transmission opportunity.

7. The method of claim 5, wherein the transmitting includes transmitting the downlink phase compensation reference signal in a downlink subframe.

8. The method of claim 5, wherein the downlink phase compensation reference signal reuses downlink channel state information reference signal (CSI-RS) transmission or reference signal (RS) transmission.

9. An apparatus configured for wireless communication, the apparatus comprising:
at least one processor; and
a memory coupled to the at least one processor,
wherein the at least one processor is configured:
to synchronize, at a base station, a phase between one or more additional base stations in a coordinated multipoint (CoMP) group serving one or more user equipments (UEs) to include the base station into the CoMP group, wherein the synchronizing is performed prior to a current transmission opportunity between the CoMP group and the one or more UEs;
to transmit or receive data in the current transmission opportunity;
to detect a phase drift that exceeds a predetermined threshold during the current transmission opportunity;
to signal the one or more UEs to transmit the phase compensation reference signal in response to the detected phase drift;
to receive a phase compensation reference signal from each of the one or more UEs subsequent the synchronization of the phase between the one or more additional base stations in the CoMP group; and
to adjust the phase according to the phase compensation reference signals.

10. The apparatus of claim 9, wherein the phase compensation reference signal uses uplink sounding reference signal (SRS) transmission.

11. The apparatus of claim 9, wherein the configuration of the at least one processor to adjust the phase includes configuration of the at least one processor:
to determine another phase drift based on the phase compensation reference signal relative to the base station;
to obtain a phase adjustment based on a comparison of the synchronized phase and the another phase drift; and
to adjust the phase by the phase adjustment.

12. The apparatus of claim 9, wherein the configuration of the at least one processor to adjust the phase includes one or more of:
configuration of the at least one processor to adjust the phase according to the phase compensation reference signals for transmission of additional downlink data to the one or more UEs in the current transmission opportunity; or
configuration of the at least one processor to adjust the phase according to the phase compensation reference signals for receipt of additional uplink data from a corresponding UE of the one or more UEs in the current transmission opportunity.

13. An apparatus configured for wireless communication, the apparatus comprising:
at least one processor; and
a memory coupled to the at least one processor,
wherein the at least one processor is configured:
to detect, at a base station, a phase mismatch between transmission and reception within a coordinated multipoint (CoMP) group among the base station and one or more additional base stations serving one or more user equipments (UEs), wherein the phase mismatch identifies a lack of phase drift reciprocity in the CoMP group, wherein the lack of phase drift reciprocity indicates that a phase drift due to transmission from a first base station in the CoMP group and reception by the one or more UEs is different from a phase drift due to reception by the first base station in the CoMP group and transmission from the one or more UEs;
in response to the detecting the phase mismatch, to transmit a downlink phase compensation reference signal;
to receive an uplink phase drift report from each of the one or more UEs in response to the downlink phase compensation reference signal; and
to adjust a phase based on the uplink phase drift report for transmission of downlink data within a current transmission opportunity.

14. The apparatus of claim 13, further including configuration of the at least one processor to synchronize the phase among the base station and the one or more additional base stations within the CoMP group, wherein the synchronizing is performed prior to the current transmission opportunity.

15. The apparatus of claim 13, wherein the configuration of the at least one processor to transmit includes configuration of the at least one processor to transmit the downlink phase compensation reference signal in a downlink subframe.

16. The apparatus of claim 13, wherein the downlink phase compensation reference signal reuses downlink channel state information reference signal (CSI-RS) transmission or reference signal (RS) transmission.

* * * * *